United States Patent

[11] 3,624,418

| [72] | Inventors | Paul B. Kohl<br>St. Paul;<br>Charles L. Osterloh, Blaine, both of Minn. |
|---|---|---|
| [21] | Appl. No. | 885,926 |
| [22] | Filed | Dec. 17, 1969 |
| [45] | Patented | Nov. 30, 1971 |
| [73] | Assignee | Control Data Corporation<br>Minneapolis, Minn. |

[54] PUSH-PULL FLOATING DRIVER
14 Claims, 3 Drawing Figs.

[52] U.S. Cl. .................................................. 307/270,
307/253, 307/88 MP
[51] Int. Cl. ...................................................... H03k 3/26
[50] Field of Search .......................................... 307/253,
254, 270, 88 MP

[56] References Cited
UNITED STATES PATENTS

| 2,904,684 | 9/1959 | Begeman | 307/88 MP |
| 2,912,602 | 12/1959 | Bownik, Jr. | 307/88 MP |
| 2,997,600 | 8/1961 | Hilberg et al. | 307/88 MP |
| 3,095,533 | 6/1963 | Keizer | 307/88 MP |
| 3,140,400 | 7/1964 | Shansky et al. | 307/270 |
| 3,142,763 | 7/1964 | Traas | 307/270 |
| 3,430,075 | 2/1969 | Gange et al. | 307/270 |
| 3,432,679 | 3/1969 | O'Brien | 307/88 MP |

OTHER REFERENCES
Blake " Static Relays," Engineering Publishers pages 43 to 51 Copyright 1961

*Primary Examiner*—Stanley D. Miller, Jr.
*Assistant Examiner*—R. E. Hart
*Attorneys*—Richard P. Ulrich, Thomas G. Devine, Joseph A. Genovese and Paul L. Sjoquist

ABSTRACT: An electronic circuit using the characteristic of a pair of inductors to provide a differential potential symmetrical with respect to a reference level. The differential potential minimizing the effects of capacity and load inductance when current is switched into the load.

PATENTED NOV 30 1971

INVENTORS
PAUL B. KOHL
CHARLES L. OSTERLOH
BY
Richard P Ulrich

INVENTORS
PAUL B. KOHL
CHARLES L. OSTERLOH

3,624,418

PUSH-PULL FLOATING DRIVER

BACKGROUND OF THE INVENTION

This invention relates to the electronic circuit art and more particularly to electronic circuits which are designed to provide pulses of current having fast rise times.

A principal cause of leading and trailing edge degradation is stray capacitance, while a principal cause of asymmetrical pulses is a lack of circuit symmetry with respect to the circuit reference potential. Several solutions to these problems have been employed in the past. One approach is to carefully design the mechanical structure to minimize stray capacitance and also to provide mechanical symmetry. Another approach often employed is to precharge stray capacitance insofar as it is possible to do so. Another approach often used in conjunction with precharging, is to divide the structure into small sections and deal with each section independently of the others insofar as it is possible to do so. A further approach is to drive sections of the structure in parallel rather than in series.

BRIEF SUMMARY OF INVENTION

The invention which is the subject of this application is a circuit which charges and discharges stray capacitance associated with the circuit rapidly and symmetrically. As is well known, the instantaneous current required to charge a capacitor is directly proportional to the capacitance and also directly proportional to the time rate of change of the voltage across the capacitance. Assuming that the magnitude of the capacitance has been reduced to a minimum through careful mechanical design, the current required to charge that capacitance is directly proportional only to the time rate of change of the voltage. Therefore, the current dedicated to charging stray capacitance can be reduced by reducing the voltage to which the capacitance is charged.

This invention comprises: a current source; inductance means through which current from the current source flows; switching means through which the current flows when the switching means is closed; and impedance means connected in series with a load, the impedance means and load being connected in parallel with the switching means so that the current flows through the impedance means and load when the switching means is open. The impedance means prevents current from leaking into the load when the switching means is closed. If the current passing through the inductance means when the switch is closed is switched into a high impedance load, a high inverse voltage is generated in the inductance means. Since the inverse voltage attempts to reestablish a current at its former steady state level, it assists in rapidly charging stray capacitance. By dividing the inductance means into two parts, one part connected between the current source and one side of the load, and the other part connected between the reference potential and the other side of the load, the inverse voltage generated is balanced with respect to the reference potential. As mentioned earlier, this balance reduces the net effect of stray capacitance and tends to improve leading edge rise and trailing edge fall of current pulse through a load as well as symmetry of load input current and output current pulse.

It is an object of this invention to provide improved circuit means which will rapidly charge and discharge stray capacitance.

It is another object of this invention to provide improved circuit means which will charge and discharge stray capacitance in a memory array comprising plurality of magnetic cores.

It is a further object of this invention to provide improved circuit means, capable of charging and discharging stray capacitance rapidly, which utilizes a pair of inductors, the inductors providing the means for rapidly reestablishing current from a constant current source in a load.

Another object of this invention is to provide means for switching a constant current from a path through switching means to a path containing the load.

Another object of this invention is to use transistor means as the switching means.

Since the inductance means employed in this invention produce wide variations in potential difference, it is another object of this invention to provide switching means which is isolated from its actuation means by isolation means thereby allowing the actuation means to be referenced to one potential and the switching means to be referenced to another potential.

Other advantages and objects will become apparent from the following description and claims when read in conjunction with the drawings.

DESCRIPTION OF THE PREFERRED EMBODIMENTS

Figure 1:
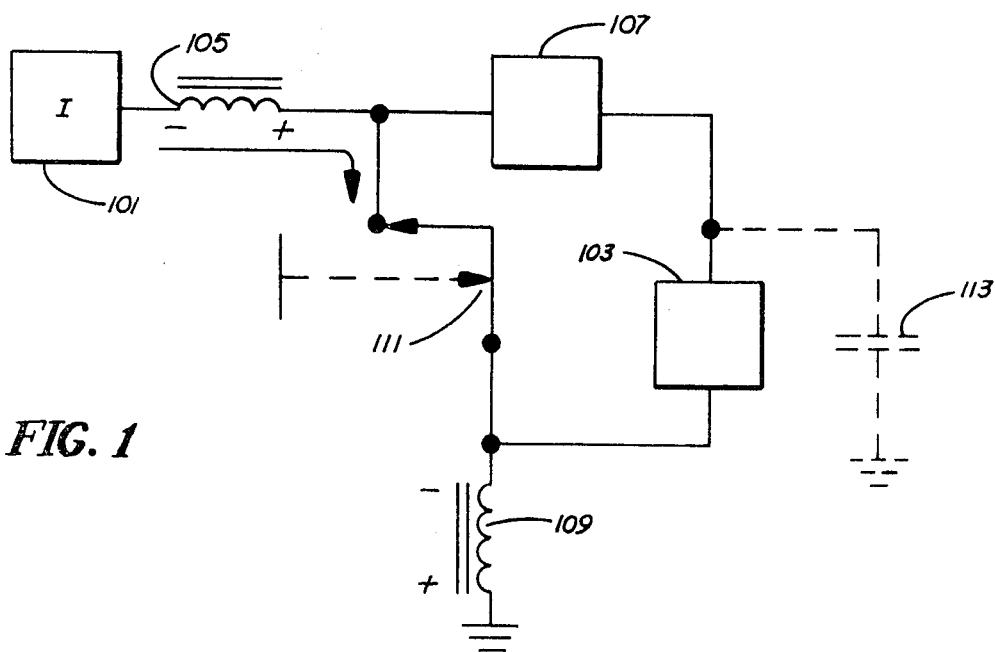
FIG. 1 is a drawing which schematically shows the elements of the invention.

With reference to FIG. 1, current source 101 is connected to load 103 through inductance means 105 and impedance means 107. The other end of load 103 is connected to the reference potential, which in this case is ground, through inductance means 109. Switching means 111 is connected at one end to the juncture of induction means 105 and impedance means 107 and at the other end to the juncture of load 103 and inductance means 109. Stray capacitance 113, although typically distributed over the circuit of load 103, is shown schematically as a single capacitor.

In operation current flows either through the path containing switching means 111 or through the path containing load 103. Assuming that current is flowing through switching means 111, the path of the current is from current source 101, through inductance means 105, through switching means 111 and through inductance means 109 to ground. When switching means 111 opens, the current is forced through the alternate path. In other words, the current from current source 101 flows through inductance means 105, impedance means 107, load 103, and inductance means 109 to ground. Since load 103 may have a high impedance, the current initially demanded by the load may be significantly reduced. If the demand for current is reduced, the potential drop across inductance means 105 and inductance means 109 rapidly increases, thereby, providing a high potential difference across the load. This high potential difference produces increased charging current for capacitor 113. Since the inductance means is symmetrical with respect to ground, the potential difference across the load is symmetrical with respect to ground. This symmetry becomes apparent when one assumes, current flows from the current source and through inductance means 105 in the direction of the arrow when switching means 111 is closed. Upon opening switching means 111, a voltage of the polarities shown on the drawing will be generated across inductance means 105 and inductance means 109. If inductance means 105 is of the same value as inductance means 109, the drop across inductance means 105 will be identical to the drop across inductance means 109. Therefore, the drop across the load will be symmetrical with respect to ground.

Figure 2:
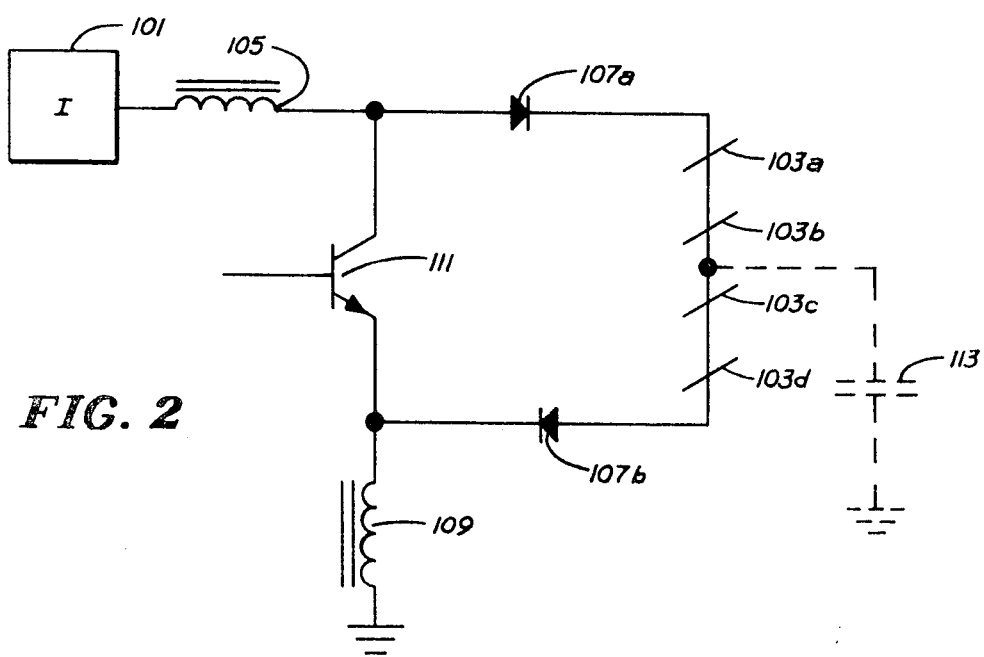
FIG. 2 shows a specific embodiment of the invention in which the impedance means is a pair of diodes and the switching means is a transistor.

FIG. 2 is identical to FIG. 1 except that generalized switching means 111 has been replaced by transistor switching means 111, generalized impedance means 107 has been replaced by diode impedance means 107a and 107b, and generalized load 103 has been replaced by a load comprising torroidal magnetic cores 103a, 103b, 103c and 103d. The operation of the circuit is the same as that described in connection with FIG. 1. Diode impedance means are used because the diode characteristic is useful in this application. The reverse bias characteristic ensures that no leakage current flows through the load when switching means 111 is closed and yet the impedance is a very low value when the diodes are forward biased. Magnetic core load means 103a, 103b, etc. is a type of load often encountered in the computer industry. This circuit has been used as a word line driver.

Figure 3:
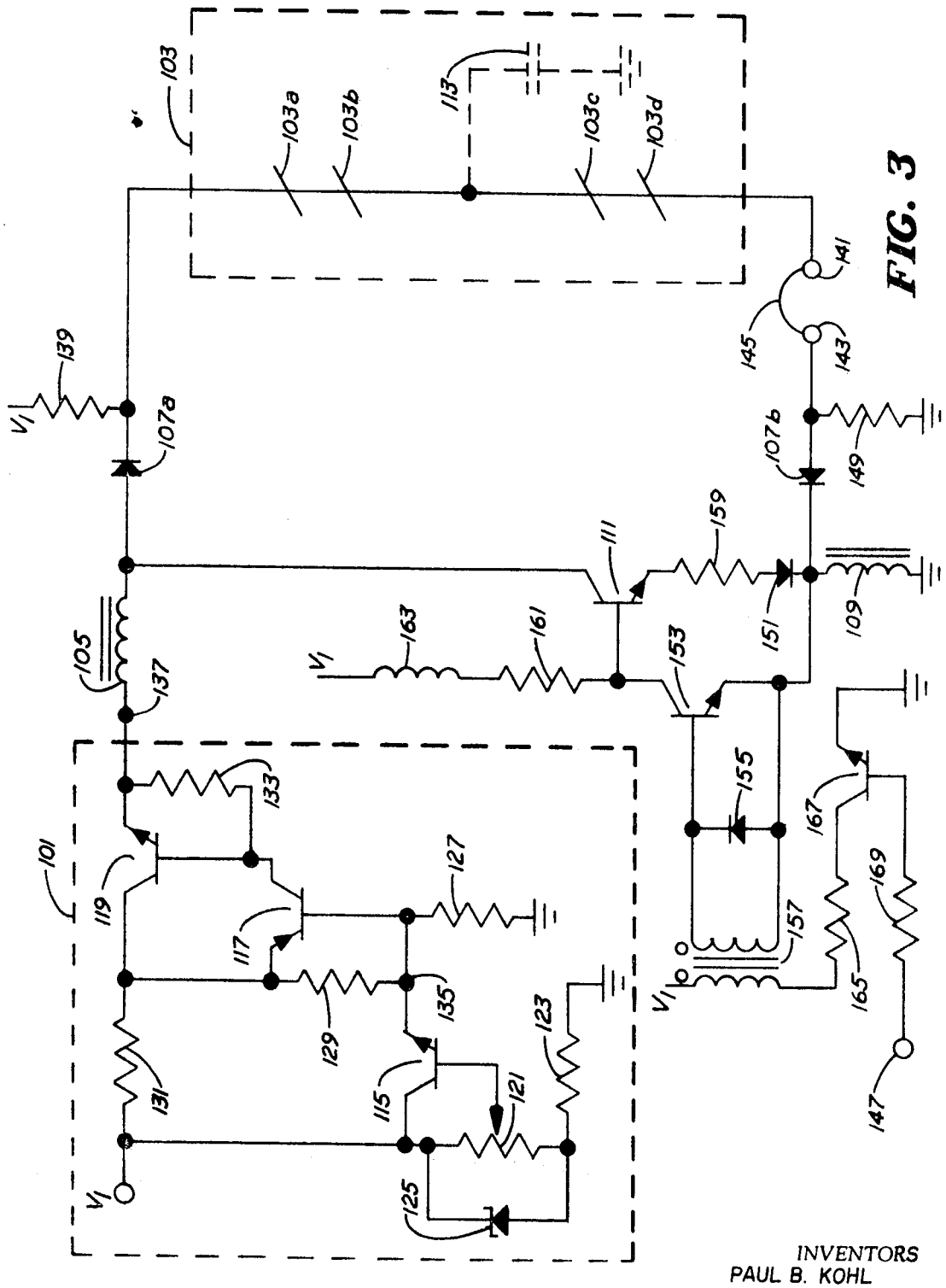
FIG. 3 is a detailed circuit schematic of the invention.

The circuit of FIG. 3 shows the components necessary to make a specific operative circuit according to this invention. The same numbers used in connection with FIGS. 1 and 2 have been used for the same elements in FIG. 3. Current source 101 comprises transistors 115, 117 and 119 plus all of the components associated with those transistors. Potentiometer 121 and resistor 123 are connected in series between voltage $V_1$ and the reference potential (ground). Zener diode 125 is connected across potentiometer 121. The movable contact of potentiometer 121 is connected to the base of transistor 115. The collector of transistor 115 is tied to voltage $V_1$ while the emitter of transistor 115 is connected to the juncture of resistors 127 and 129. This junction point is also connected to the base of transistor 117. The other end of resistor 127 is connected to ground. The opposite end of resistor 129 is connected to the emitter of transistor 117, the collector of transistor 119, and one end of resistor 131. The other end of resistor 131 is connected to voltage $V_1$. The collector of transistor 117 is connected to the base of transistor 119 and also to one end of resistor 133. The other end of resistor 133 is connected to the emitter of transistor 119 and to one end of inductor 105.

Zener diode 125 sets the voltage drop across potentiometer 121 thereby providing an accurate reference voltage irrespective of variations in ground or voltage $V_1$. Transistor 115 which is an emitter follower establishes a reference level at point 135. This reference level can be changed by adjusting the movable element of potentiometer 121. Since transistor 117 is also an emitter follower, its emitter attempts to maintain a fixed relationship with the voltage on the base. Since the signal level at the base of transistor 117 is controlled by the reference voltage, and the emitter follows the base, the reference voltage establishes the amount of current which is drawn through resistor 131. The current flowing through transistor 119 is controlled by the collector current of transistor 117. Increased collector current through transistor 117 produces increased emitter-base forward bias and more collector current through transistor 119. The circuit stabilizes when further increase in current through resistor 131 tends to reduce the collector current of transistor 117. Once stabilization has been achieved, an increase in demand for current from the load produces an increased drop across resistor 131 which in turn reduces the collector current of transistor 117. Reduction of collector current through transistor 117 reduces the forward bias of transistor 119 and reduces the collector current passing through transistor 119 and thereby restores the current supplied by current source 101 to the desired level. The reaction of current source 101 to a decrease in demand for current is exactly opposite to that heretofore described in connection with an increased demand. Therefore, that reaction will not be discussed.

The output of current source 101 appears at terminal 137. One end of inductance means 105 is connected to terminal 137 while the other end of inductance means 105 is connected to the juncture of the anode of diode impedance means 107a and the collector of switching means 111. The cathode of diode impedance means 107a is connected to the juncture of one end of resistor 139 and one side of the load 103. The other end of resistor 139 is connected voltage $V_1$, while the other end of load 103 is connected to terminal 141. Terminals 141 and 143 are shown connected by wire 145. In the alternative, (not shown) an NPN-transistor may be substituted for wire 145. If the substitution is made, the emitter of the transistor is connected to terminal 143, the collector of the transistor is connected to terminal 141 and the base of the transistor is connected through a resistor to terminal 147. The transistor provides faster current pulse fall time. Terminal 143 is attached to the juncture between the anode of diode impedance means 107b and resistor 149. The other end of resistor 149 is connected to the reference voltage (ground) while the cathode of diode impedance means 107b is connected to the juncture of inductance means 109, the cathode of diode 151, the emitter of transistor 153, the anode of diode of 155, and one end of the secondary winding of transformer 157. The other end of inductance means 109 is connected to ground. The anode of diode 151 is connected to one end of the resistor 159. The other end of resistor 159 is connected to the emitter of transistor 111 while the base of transistor 111 is connected to the juncture of the collector of transistor 153 and one end of resistor 161. The other end of resistor 161 is connected to one end of inductor 163 and the other end of inductor 163 is connected to voltage $V_1$. The base of transistor 153 is connected to the cathode of diode 155 and the other end of the secondary winding of transformer 157. The primary winding of transformer 157 is connected between voltage $V_1$ and one end of resistor 165. The other end of resistor 165 is attached to the collector of transistor 167. The emitter of transistor 167 is connected to ground. The base of transistor 167 is connected to one end of resistor 169 while the other end of resistor 169 is attached to terminal 147.

Since the basic operation of the invention has been described in connection with FIGS. 1 and 2, that description will not be repeated here. However, several features not shown in FIGS. 1 and 2 will be discussed below.

When no current is flowing through load 103, transistor 167 is not conducting, transistor 153 is not conducting, and transistor 111 is conducting. Upon receipt of a positive going input pulse, transistor 167 begins to conduct. The current flowing through the primary of transformer 157 induces a voltage in secondary of transformer 157 in such a polarity that the base of transistor 153 goes positive, thereby, turning transistor 153 on. When transistor 153 turns on, transistor 111 is cut off thereby forcing the current from current source 101 to flow through the load.

Several components are shown in FIG. 3 which were not shown in FIGS. 1 and 2. Resistors 139 and 149 form a voltage divider which ensures that diodes 107a and 107b will be reverse biased when current is flowing through switching means 111. Diode 151 in series with the emitter of transistor 111 ensures that transistor switching means 111 is completely cut off when transistor coupling means 153 conducts. Since the emitter of transistor coupling means 153 goes through significant shifts in voltage level because it is tied to inductance means 109, inductor 163 is placed in transistor 153's collector circuit to control the base current of transistor 111 and the collector current of transistor 153 during these voltage gyrations. In other words, a principal purpose of inductor 163 is to limit the collector current of transistor 153 so that current is supplied to inductance means 109 from the load and not through transistor 153.

Resistor 165 in the collector circuit of transistor actuation means 167 is a current limiting resistor. Resistor 159 in the emitter circuit of transistor 111 is of a very low value and is unnecessary to the proper operation of the circuit as shown in FIG. 3. However, when transistor 111 is replaced with a plurality of transistors connected in parallel to increase current carrying capacity, small resistance 159 tends to force equal distribution of current among the parallel transistors. The values of the components listed on the following page have been used to provide an operative embodiment:

| | | |
|---|---|---|
| Potentiometer | 121 | 2 k. ohms |
| Resistor | 123 | 290 ohms |
| Resistor | 127 | 180 ohms |
| Resistor | 129 | 1.2 k. ohms |
| Resistor | 131 | 2 ohms |
| Resistor | 133 | 680 ohms |
| Resistor | 139 | 12 k. ohms |
| Resistor | 149 | 12 k. ohms |
| Resistor | 159 | 8—2.7 ohms resistors in parallel |
| Resistor | 161 | 2—56 ohms in series |
| Resistor | 165 | 8—1.2 kΩ resistors in parallel |
| Resistor | 169 | 47 ohms |
| Zener Diode | 125 | 1N703/3.45 volts |
| Transistor | 115 | Motorola MM1007 |

| | | |
|---|---|---|
| Transistor | 117 | 2N2904A |
| Transistor | 119 | RCA 40250 |
| Transistor | 111 | 8—2N3253 |
| Transistor | 153 | 1—2N3253 |
| Transistor | 167 | 2N709 |
| Diode | 107A | 1N4001 |
| | 107B | 1N4001 |
| Diode | 151 | 1N4001 |
| Diode | 155 | Fairchild FDS624 or 6137 |

Transformer 157 17 turns primary, 20 turns secondary 31-gauge wire; wound on Ferroxcube core made of 3D3 material; OD 0.23 inches ID point 0.12 inches.

Inductors 105, 109, and 163 wound on Ferroxcube 266T125 core; material 3C; 90 turns 32-gauge magnet wire.

I claim:
1. An electronic circuit comprising:
   a. a current source;
   b. switching means through which current from the current source flows when the switching means is closed, thereby, providing a first current path;
   c. impedance means, connected in series with a load including a plurality of magnetic elements, the impedance means and load connected in parallel with the switching means, the impedance means and load forming an alternate path through which current from the current source flows upon opening the switching means; and
   d. a pair of inductors, one connected between the current source and one juncture of the current paths, and the other connected between a reference potential and a second juncture of the current paths.

2. The circuit as claimed in claim 1 wherein the impedance means in the alternate path is at least one diode.

3. The circuit as claimed in claim 1 wherein the switching means is electronic switching means, and further comprising electronic actuation means which is connected to the electronic switching means by isolation means, thereby, allowing the actuation means to be referenced to one potential and the switching means to be referenced to another potential.

4. The electronic circuit as claimed in claim 2 wherein the impedance means is at least one diode.

5. The electronic circuit as claimed in claim 3 wherein the isolation means comprises: a transformer having its primary winding connected to the actuation means; and coupling means having its input connected to the transformer secondary winding and its output connected to the switching means.

6. The electronic circuit as claimed in claim 5 wherein the coupling means comprises: transistor means having inductance means in its collector circuit whereby the initial surge of current occurring when current is caused to flow in the transistor means is reduced.

7. The electronic circuit as claimed in claim 6 wherein the electronic switching means comprises a switching transistor, and further comprising diode means connected serially in the emitter circuit of the switching transistor, the diode means ensuring that the switching transistor will be cut off during an input pulse.

8. The electronic circuit claimed in claim 7 further comprising transistor means in series with the load means, the transistor means ensuring rapid cessation of load current upon disappearance of an input pulse.

9. The apparatus of claim 2 further comprising means for back biasing each diode when current is flowing through the switching means.

10. The apparatus of claim 9 wherein the back biasing means comprise a voltage source of preselected potential associated with each diode and a resistor associated with each diode and connecting the associated voltage source with the connection between the diode and the load.

11. The apparatus of claim 1 wherein the impedance means comprises a first diode connected between one inductor and the load and a second diode connected between the other inductor and the load both in a direction being forward biased by current from the current source.

12. The apparatus of claim 11 including means for back biasing each diode when current is flowing through the switching means.

13. The apparatus claim 12 wherein the back biasing means including a first resistor and a first voltage source associated with the first diode and a second resistor and a second voltage source associated with the second diode, each resistor connecting its associated voltage source to the connection of the associated diode with the load, each resistor and voltage source having values sufficient to maintain the diodes in a back biased condition when the switching means is closed, and not preventing forward biasing of the diodes when the switching means is opened.

14. An electronic circuit for supplying sufficient current to partially select a plurality of magnetic cores comprising:
   a. a constant current source;
   b. a first inductor connected at one end to the current source;
   c. a first diode having its anode connected to the other end of the first inductor and its cathode connected to a load;
   d. transistor switching means having its collector connected to the juncture of the first diode and first inductor;
   e. a second diode having its anode connected to the emitter of the transistor switching means and ensuring that the transistor switching means cuts off;
   f. a second inductor connected on one end to the cathode of the second diode and on the other end to ground;
   g. a third diode having its cathode connected to the juncture of the second inductor and the second diode and its anode connected to the other end of the load;
   h. transistor coupling means having its emitter connected to the juncture of the second inductor and the second diode, and its collector connected to the base of the transistor switching means;
   i. a third inductor connected in the collector circuit of the transistor coupling means and providing reduced current flow when the transistor coupling means is turned on;
   j. a transformer, the secondary winding of which is connected between the emitter and base of the transistor coupling means; and
   k. transistor input means having its emitter connected to ground, the primary winding of the transformer as part of its collector load and receiving an input pulse on its base.

* * * * *